June 26, 1962 R. R. CARLTON 3,040,602
SAW CHAIN SHARPENER AND METHOD
Filed Oct. 12, 1959 3 Sheets-Sheet 1

INVENTOR.
Raymond R. Carlton
BY
Buckhorn, Cheatham & Blore
ATTORNEYS

June 26, 1962 R. R. CARLTON 3,040,602
SAW CHAIN SHARPENER AND METHOD
Filed Oct. 12, 1959 3 Sheets-Sheet 2

INVENTOR.
Raymond R. Carlton
BY
Buckhorn, Cheatham & Blore
ATTORNEYS

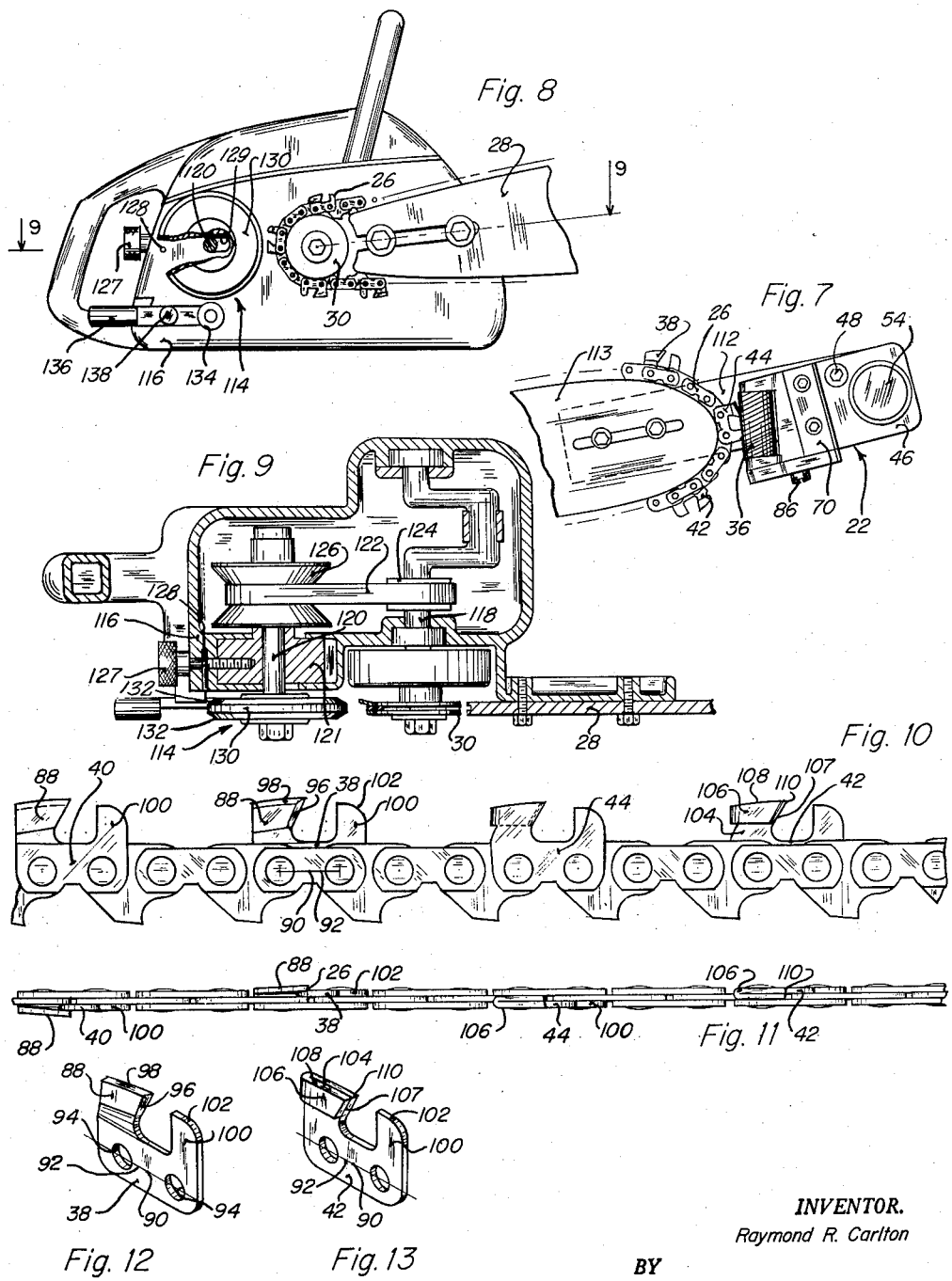

United States Patent Office 3,040,602
Patented June 26, 1962

3,040,602
SAW CHAIN SHARPENER AND METHOD
Raymond R. Carlton, Portland, Oreg., assignor to Omark Industries, Inc., Portland, Oreg., a corporation of Oregon
Filed Oct. 12, 1959, Ser. No. 845,788
13 Claims. (Cl. 76—38)

This invention relates to a saw chain sharpener and to a method of sharpening a saw chain and more particularly to a method of maintaining a saw chain in sharpened condition while in use on a chain saw, and to a device forming a part of a chain saw which can be employed to sharpen a saw chain on such saw while the chain is mounted upon a chain saw bar and being driven by a chain saw sprocket.

Mechanisms for use in sharpening a saw chain while in position upon a chain saw and being driven by the chain saw sprocket have been suggested in the prior art. Such mechanisms have taken the form of saw sharpening devices temporarily mounted upon the nose end of the saw bar, which is the end remote from the sprocket. Such devices have included sharpening elements brought into contact with the cutter elements of the cutter links of scratcher type chain as such cutter links are moved around the nose of the cutter bar. The surfaces of the cutter elements thus contacting the sharpening element are those most remote from the saw bar which surfaces will be herein referred to as the outer surfaces of the cutter links.

By positioning the cutter elements of the cutter links rearwardly of the midpoint of lines joining the centers of the rivets or other pivots of the respective cutter links, it has been possible to sharpen scratcher type cutter elements and produce a type of relief on the cutting elements which is effective for cutting with the portion of the chain traveling along a side edge of the saw bar. This type of cutting is frequently called "slicing." The outer surfaces thus produced are, however, concentric with the curved nose portion of the saw bar. They have no relief at all so far as the operations with a chain saw known as "stabbing" or "boring" is concerned. Such operation has become an established and important method of using a chain saw and consists of pushing the nose end of the chain saw endwise into a tree, log or other object being cut so that the cutting is actually accomplished by the cutter elements which are being carried around the nose end of the bar. Unless such cutting elements are provided with properly relieved outer surfaces, the boring operation is inefficient and difficult. Thus excessive force is required to force the nose end of the chain saw into the wood being cut.

Mounting the sharpening mechanism upon the nose end of the cutter bar has also required that the chain saw be taken out of service while the sharpening mechanism is being attached and detached as well as during the time a sharpening operation is being actually carried out. This has restricted the utility of prior art sharpening devices intended for use while the saw chain is mounted upon a chain saw and is being driven by the chain saw sprocket.

In accordance with the present invention, the difficulties above discussed are eliminated by mounting a sharpening device directly upon the body of the chain saw adjacent the chain saw sprocket so as to remove metal from the outer surfaces of the cutter links. Such sharpening device can be left in place upon the saw at all times and if desired, can actually be employed to sharpen the saw chain upon the chain saw while the saw is being employed in a cutting operation. In any event, the sharpening device need not be removed during operation of the saw but may be allowed to remain attached to the saw at all times so that it is not necessary to take the saw out of service while attaching and removing a sharpening mechanism. Also by employing a chain saw sprocket of substantially smaller radius than the radius of curvature of the nose end of the saw bar, proper relief of the outer surfaces of the cutter elements of the saw chain can be produced so that efficient boring with the sharpened saw chain as well as slicing can be accomplished.

The sharpening element of the saw chain sharpener of the present invention can be shaped so as to effectively sharpen nearly any type of scratcher saw chain which has the cutting elements thereof rearwardly of the midpoints of the respective cutter links as discussed above. The sharpening device is, however, particularly effective for sharpening a new type of scratcher chain disclosed herein in which each cutter link whether it be of a type having a side slitter cutter element or of a type having a raker cutter element thereon, is also provided with a depth gauge which has an outer kerf bottom contacting surface spaced forwardly of such midpoint of the respective cutter link a greater distance than the cutting portion of the cutter element of such link is spaced rearwardly from such midpoint. The outer surfaces of such depth gauges are thus given proper relief not only for slicing operations of the chain saw but also for boring operations. The relief of the outer surfaces of such depth gauges as well as the relief of the outer surfaces of the cutter elements of a properly constructed chain is of such uniformity throughout the length of the chain as to provide a smooth operation and rapidity of cutting of a greater order than possible with prior saw chains.

It is therefore an object of the present invention to provide an improved method of sharpening saw chains and an improved saw chain sharpener to give effect to such method.

Another object of the invention is to provide a method of sharpening a saw chain while the chain is in position upon a saw chain bar and being driven by a saw chain sprocket in which method proper relief of the outer surfaces of the cutter links of the saw chain is produced not only for chain saw slicing operation but also for chain saw boring operations.

Another object of the invention is to provide a method of sharpening a saw chain while in position upon a saw bar of a chain saw and driven by the sprocket of such saw in which method the sharpening operation is effected while the cutter links are being carried around a saw chain sprocket of substantially smaller radius than the radius of curvature of the nose of the saw bar with which the saw chain is used.

Another object of the invention is to provide an improved method of sharpening a scratcher type saw chain in which each cutter link has a depth gauge spaced forwardly of a cutter element on such link so as to provide proper clearance of the depth gauge and cutter element outer surfaces for boring as well as slicing operations of the chain saw, which method is carried out while the chain is in position upon the chain saw and driven by the saw chain sprocket and which method may be even carried out when the chain saw is being employed in a cutting operation.

A further object of the invention is to provide a saw chain sharpening device which may be permanently mounted upon a chain saw and left in position while the saw is used for boring as well as stabbing operations and which may be employed at any time the saw is running to sharpen a properly constructed saw chain.

A still further object of the invention is to provide a saw chain sharpening device which may be employed to remove metal from the outer surfaces of cutter links of properly constructed scratcher type saw chain, including an improved chain with depth gauges upon all side slitter and raker links, so as to sharpen such chain while the saw is running, which method includes contacting a sharpening element with such outer surfaces of cutter links being carried around a chain saw sprocket of less radius than the radius of curvature of the nose of the saw bar upon which such chain is employed.

Other objects and advantages of the invention will appear in the following description of the invention including the structures shown in the attached drawing of which:

FIG. 7 is a fragmentary side elevation showing a modified manner of mounting the saw chain sharpening device of FIGS. 1 to 6 upon a chain saw;

FIG. 8 is a view similar to FIG. 1 showing a modified saw chain sharpening device;

FIG. 9 is a somewhat diagrammatic horizontal section through the chain saw of FIG. 8 on line 9—9 of FIG. 8;

FIG. 10 is a side elevation of a saw chain which is particularly adapted for sharpening by the method of the present invention and by the sharpening devices of the present invention;

FIG. 11 is a top plan view of the saw chain of FIG. 10;

FIG. 12 is a perspective view of a side slitter cutter link of the saw chain of FIGS. 10 and 11; and FIG. 13 is a view similar to FIG. 11 of a raker cutter link of the saw chain of FIGS. 10 and 11.

Figure 1:
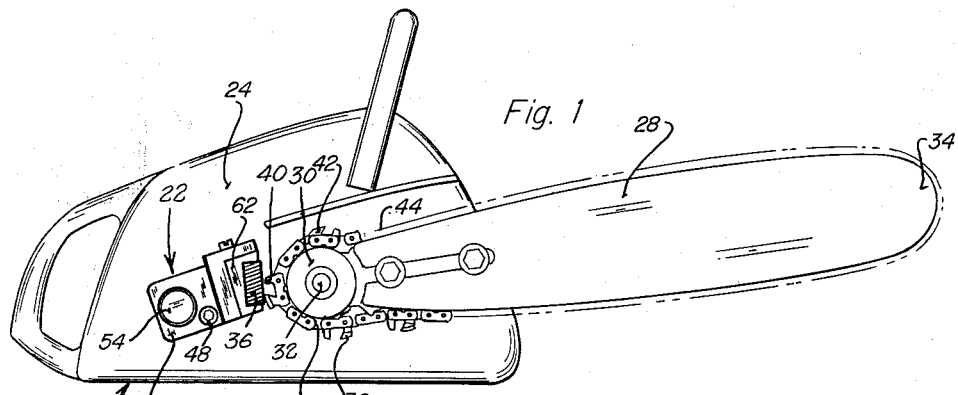
FIG. 1 is a somewhat diagrammatic side elevation of a chain saw showing a sharpening device in accordance with the present invention mounted thereon.

Referring more particularly to the drawing, a chain saw 20 is shown in FIG. 1 as having a saw chain sharpening device 22 mounted upon the motor housing or body 24 of the saw in position to sharpen a saw chain 26 mounted upon a saw bar 28 secured to and extending from the body 24 of the saw. The chain 26 is also mounted upon and driven by a chain saw sprocket 30 which in turn is mounted upon a sprocket drive shaft 32 driven by the saw chain motor (not shown). The sprocket 30 has a smaller pitch radius than the pitch radius of the nose end 34 of the saw bar 28 and the sharpening device 22 has a sharpening element 36 positioned for contact with the outer surfaces of the various cutter links 38, 40, 42 and 44 as they are carried around the periphery of the sprocket 30.

Figure 2:
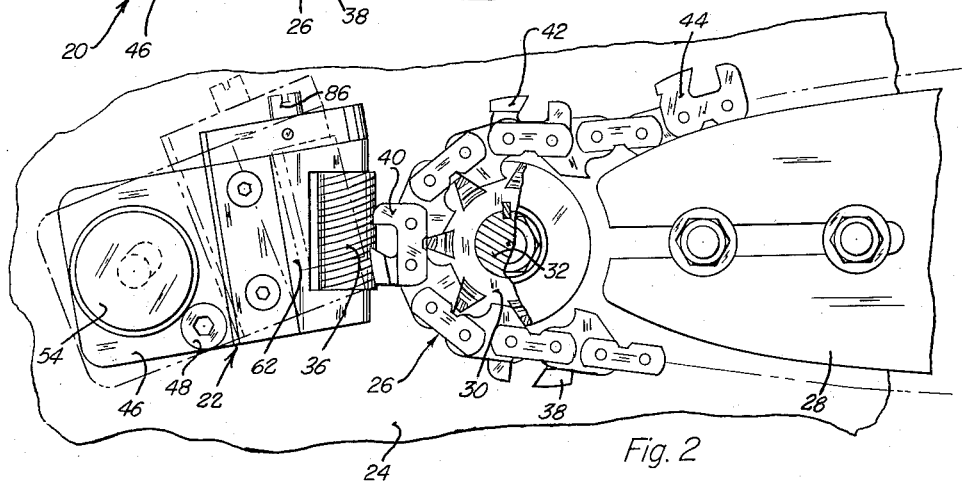
FIG. 2 is a fragmentary side elevation showing a portion of the structure of FIG. 1, including the saw chain sharpening device thereof on a greatly enlarged scale and with parts of the chain saw sprocket broken away.
Figure 3:
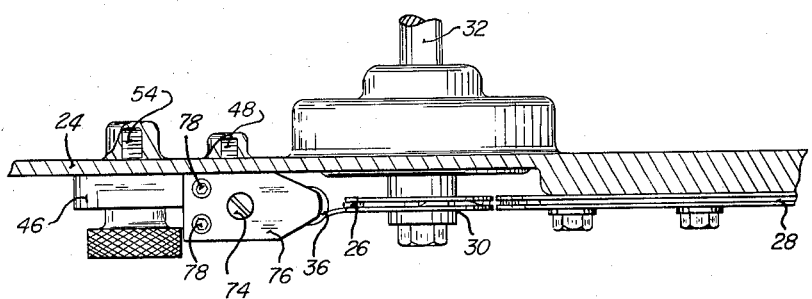
FIG. 3 is a fragmentary horizontal section through the structure of FIG. 2 showing the saw chain sharpening device in top plan.

The details of the sharpening device 22 are shown in FIGS. 2 to 6 and include a base block 46 pivotally secured adjacent its lower right corner in FIGS. 1 and 2 to the body 24 of the chain saw by means of a screw 48 having an enlarged head received in a socket 50 (FIG. 6) in the base block 46 and having a shank screw threaded into the body of the chain saw. The base block 46 also has an arcuate slot 52 concentric with the axis of the screw 48 extending through the body of the base block adjacent its end opposite the screw 48. Such slot 52 receives the shank of a clamping screw 54 having an enlarged knurled head, the end of the shank of the screw also being screw threaded into the body 24 of the chain saw. It will be apparent that the base block 46 of the sharpening device 22 can be pivoted about the screw 48 between the operative position of the sharpening device shown in full lines in FIG. 2, and the inoperative position of such device shown in dash-dot lines in such figure and that the base block 46 can be clamped in either position by the clamping screw 54.

The sharpening element 36 is of cylindrical shape having an axial bore 56 (FIG. 6) therein and an outer cylindrical surface provided with a plurality of helically extending metal cutting teeth 58 (FIG. 4) preferably of the form shown in such figure with properly relieved downwardly directed cutting edges 60. Such sharpening element is preferably made of a hard alloy capable of remaining sharp while employed to remove metal from the cutter links of a saw chain. The sharpening element is supported between the yoke portions of a yoke shaped slide member 62 and is journaled for rotating in such slide member 62 about the axis of a screw 64 (FIG. 6) extending through the yoke portions of the slide member and having one end screw threaded into one of such yoke members. The slide member 62 is mounted for vertical sliding motion along the edge of the base block 46 by means of a dovetail element 66 on the slide member 62 and a dovetail slot structure on the base block 46 including an integral undercut portion 68 and a cooperating removable guiding element 70 having an undercut portion and held in posiiton on the base block 46 by screws 72 having shanks threaded into the base block.

The slide member can be adjusted vertically of the base block 46 by an adjusting screw 74 having a shank extending through a bore in a top plate 76 secured to the base block 46 and removable guiding element 70 by the screws 78. The screw 74 is held against axial movement relative to the plate 76 by a pin 80 extending laterally through a bore 81 in the plate 76 and engaging in a groove 82 in the shank of the screw 74. The shank of the screw is threaded into a vertically extending bore in the slide member 62. By rotating the screw 74 by its knurled and slotted head 86, the slide member can be moved from the upper position shown in FIG. 4 toward the lower position shown in FIG. 5.

The axis of the sharpening element 36 is inclined to the direction of sliding motion of the slide member 62 provided by the dovetail portion 66 of the slide member so that the top end of the sharpening element is spaced farther from such dovetail portion than the lower end of such sharpening element. The axis of the sharpening element is also in the central plane of the saw chain 26 and sprocket 30 therefor and it will be apparent from FIG. 2 that downward adjustment of the slide member 62 by the screw 86, when the sharpening device is in the operative position shown in full lines in FIG. 2, will advance the sharpening element toward the saw chain 26 on the sprocket 30.

The operation of the saw sharpening device of FIGS. 1 to 6 should be apparent from the above description thereof. With the sharpening device clamped in the position shown in FIG. 1 and in full lines in FIG. 2 by the screw 54, the saw is started and the saw chain 26 on the sprocket 30 and saw bar is driven by the sprocket so as to move the saw chain cutter links 38, 40, 42 and 44 in a clockwise direction around the periphery of the sprocket. The screw 86 is adjusted to cause the sharpening element 30 to engage the outer surfaces of the cutter links of a scratcher type chain to remove metal therefrom. Since the sharpening element is convex toward the saw chain, the cutter portions of the raker cutter links are cut or ground lower than the cutter portions of side slitter cutting links. This is true because such portions of raker cutter links are nearer the central plane of the chain than those of side slitter cutter links. Also since the cutter teeth on the sharpening element are of helical form, the sharpening element revolves on the screw 64 to constantly present new cutting edges and distribute the wear circumferentially around such element. After a sharpening operation, the sharpening device 22 can be moved to the inoperative position shown in dotted lines in FIG. 2 until another sharpening operation is needed.

Nearly any type of scratcher chain having its cutter portions positioned rearwardly of the midpoint of a line joining the centers of the pivots of the respective cutter links can be sharpened by the sharpening device of the present invention. If the cutter portions are positioned rearwardly of such midpoint, cutting edges are formed on the forward edges of such portions and the outer surfaces of such cutter portions are provided with relief so that such cutting edges can engage the wood to be cut, and if the sprocket of the saw is of smaller radius than the radius of curvature of the nose of the saw bar, this is true even in a boring operation. Also the concave surface of the sharpening element presented to such outer surfaces bevel the cutting edges on the side slitter cutter link to provide side slitting cutting edges.

An improved type of scratcher chain particularly adapted for being sharpened by the method and sharpening devices of the present invention is shown in FIGS. 10 to 13 inclusive. Such chain is shown in FIGS. 10 and 11 as having a left slitter cutter link 38 followed by a right side slitter cutter link 40 and a left raker cutter link 42 followed by a right raker cutter link 44. The order of such links is different from that shown in FIG. 2 but the order of such links may be varied. In general a pair of side slitter cutter links made up of right and left side slitter cutter links will be followed by a pair of raker cutter links made up of right and left raker cutter links and the latter pair will again be followed by a pair of side slitter cutter links, etc. Also, in general, alternate cutter links will be right and left cutter links.

A left side slitter link is shown in FIG. 12 as having an outwardly projecting cutter element 88 which is positioned rearwardly of the midpoint 90 of a line 92 joining the centers of the rivet holes 94 of the cutter link 38 so that the point 90 is the midpoint of a line joining the centers of the pivots of such link. The cutter element 88 is inclined laterally of the chain in both a direction outwardly of the chain and forwardly thereof, as shown most clearly in FIG. 11, and has a leading edge portion 96 beveled to provide a sharpened forwardly directed edge at the lateral extremity of the cutter element, which edge is inclined forwardly and laterally of the cutter element. The engagement of the sharpening element 36 of FIGS. 1 to 6 with the cutting element 88 while the cutter link 38 is being carried around the sprocket 30 will produce an arcuate beveled surface 98 and a cutting edge which has proper relief rearwardly of the leading edge 96.

The cutter link 38 also has an outwardly projecting depth gauge 100 thereon having its trailing edge positioned forwardly of the midpoint 90 of the line 92 a greater distance than the leading edge 96 of the cutter element 88 is positioned rearwardly of such midpoint. This means that the outer kerf bottom engaging surface 102 of depth gauge 100 is positioned a greater distance forwardly of the midpoint 90 than the cutting portion of the cutting element 88 is positioned rearwardly of such midpoint. This further means that the surface 102 is nearer the line 92 than the cutting portion of the cutter element. Such cutting portion is the leading outer corner of such cutting element. This provides the depth gauge 100 with proper relief for cutting operations including both slicing and boring operations. The cutter link 40 is allochiral to the cutter link 38 and will not be further described.

The left raker cutter link 42 is shown most clearly in FIG. 13 and includes an outwardly projecting raker cutter element 104 which is laterally thickened by having an extending portion 106 bent back upon itself and spot welded to the body of the raker element. The raker element is inclined slightly laterally in both an outward and forward direction and has a leading edge portion 107 positioned rearwardly of the midpoint 90 of the link 42. The edge portion 107 is inclined forwardly as well as laterally. The raker cutter element 104 has metal removed from its outer surface 108 by the sharpening element of FIGS. 1 to 6 during sharpening of the chain to provide a sharpened cutting edge 110. The depth gauge 100 of the link 42 may be identical with the depth gauge 100 of the link 38 and may occupy the same relative position with respect to its associated cutting element so that its outer surface 102 is nearer the line 92 than the cutting edge 110 to provide proper relief for such depth gauge. The right raker cutter link 44 is allochiral to the link 42 and will not be further described.

Scratcher chains have been known to be smooth running, rapid cutting chains when properly sharpened and the main reason they have not been more generally employed is that proper sharpening has been difficult and time consuming even for an expert when compared to other more generally employed chains. With the present chain having depth gauges on all cutter links and precise sharpening such as provided by the method and devices of the present invention, a new order of rapid cutting and smooth operation is accomplished with a chain which can be sharpened in a matter of seconds without removing the chain saw from service.

With chain saws which cannot be modified to install the sharpening device of FIGS. 1 to 6 upon the body of the chain saw, it is possible to temporarily install the sharpening device 22 upon a support plate 112 shown in FIG. 7 and then secure such plate to the nose end of a suitably modified chain saw bar 113. The sharpening device 22 can be employed to sharpen cutter links 38, 42 and 44 as they are carried around the nose end of the bar. This merely illustrates the versatility of the sharpening device 22 but does not accomplish all of the results of the method of the present invention. The employment of the sharpening device as illustrated in FIG. 7 will sharpen a scratcher chain of the type illustrated or any of the types discussed above adequately for slicing operations of the chain saw but not for efficient boring operations, since proper relief is not provided for boring.

Figure 4:
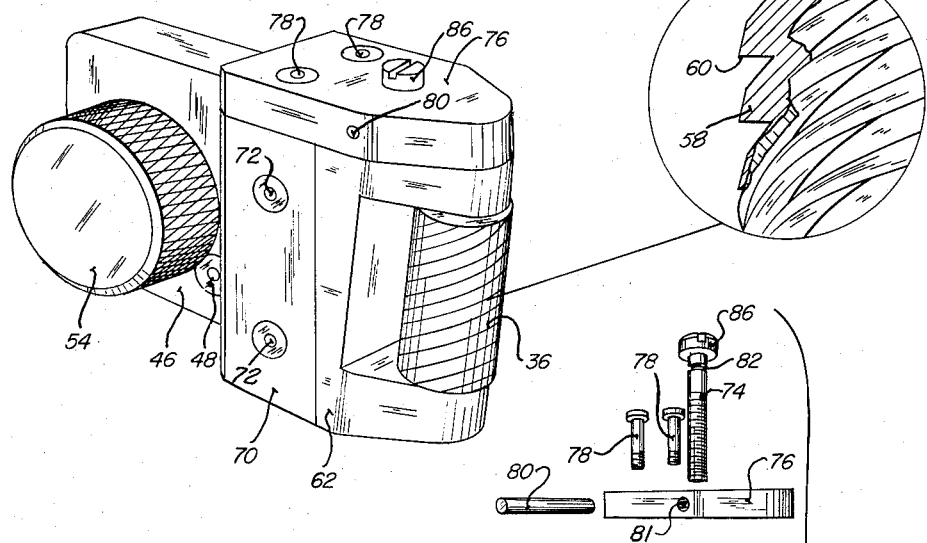
FIG. 4 is an isometric view of the saw chain sharpening device on a still larger scale.
Figures 5, 6:
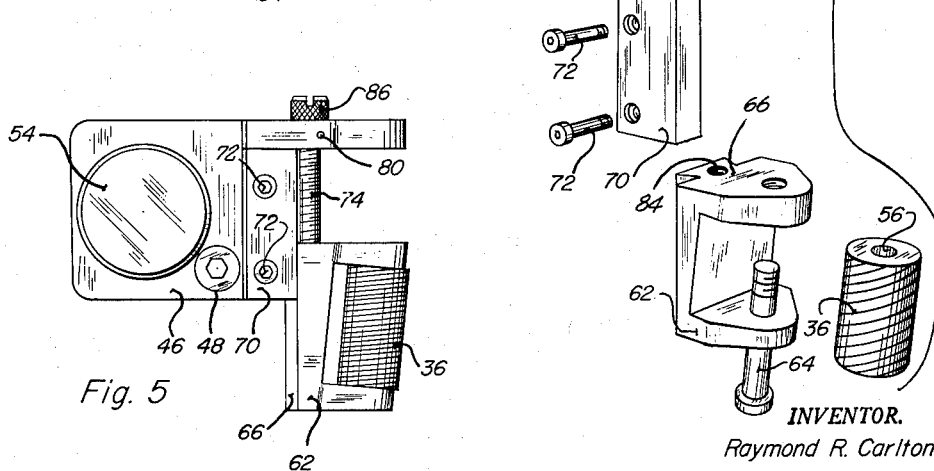
FIG. 5 is a side elevation of the saw chain sharpening device with certain parts in a different position than in FIGS. 2 and 4.
FIG. 6 is an isometric exploded view of the saw chain sharpening device of FIGS. 1 to 5.

In any of the uses of the sharpening devices 22, the sharpening element may, for example, be of tungsten carbide, tantalum carbide or titanium carbide, or any of the other hard carbides or other hard materials employed as cutting elements for removing metal such as steel from metal surfaces. A tungsten carbide metal removing sharpening element formed with a plurality of helical cutting teeth, such as shown in FIG. 4, has been found particularly effective but other metal removing elements, such as suitable soft metals with diamonds or other hard materials embedded therein, can be employed.

A modified sharpening device 114 for carrying out the method of the present invention is shown in FIGS. 8 and 9. In such figures a saw bar 28 and sprocket 30 support and drive a saw chain 26 and all of such elements may be the same as the corresponding elements described with reference to FIGS. 1 to 6 and 10 to 13. The chain saw has a modified body portion 116 in the form of a casing in which the main drive shaft 118 of the saw is journaled, such shaft having the sprocket 30 mounted upon one of its ends which is external to the casing 116.

The sharpening device 114 includes another shaft 120 journaled in a bearing block 121 slidable in the casing 116 toward and away from the shaft 118. The shaft 120 is driven from the shaft 118 by a belt 122 on pulleys 124 and 126 on the shafts 118 and 120, respectively, the pulley 126 being any suitable or known type of spring expansible pulley so that the shaft 120 can be moved toward and away from the shaft 26 while being driven by the belt 122. Movement of the shaft toward and away from the shaft 118 can be accomplished by sliding the bearing block 121 in the casing 116 by means of a screw 127 passing through the end wall of the casing 116 and having its shank screw threaded into the bearing block 121. The screw is rotatable in the casing 116 but is held against axial movement therein by a pin 128 engaging in a groove in the shank of the screw 127. It is apparent that turning of the adjusting screw will advance the shaft 120 toward the shaft 118 or retract it depending upon the direction the screw is turned.

The shaft 120 has an end projecting through a slot 129 in a side wall of the casing 116 and has a metal removing member in the form of a grinding wheel 130 mounted on such end exteriorly of such casing. The central plane of the grinding wheel 130 is in the central plane of the sprocket 30 and chain 26 and has its outer periphery shaped to provide beveled edges 132 for properly grinding the cutter elements of scratcher chains of the types above described. Such shape of the outer periphery of the grinding wheel may be maintained by a grinding wheel dresser 134 which may be of any suitable type, such as a conventional pressure dresser. The dresser 134 is rotatively mounted upon the end of a lever 136 pivoted to the casing 116 at 138 so that the dresser 134 can be manually held against the periphery of the grinding wheel 130.

It will be apparent that the shaped outer periphery of the grinding wheel 130 may be brought into engagement with the outer surfaces of the cutter elements of the cutter links of the saw chain 26 while such cutter links are being carried around the sprocket 30 and while the wheel 130 is being rapidly rotated to remove metal from such outer surfaces. The result is to sharpen the saw chain and provide properly relieved outer surfaces on the cutter elements and any depth gauges on the chain of the same type described above with reference to the sharpening device of FIGS. 1 to 6. Again the scratcher saw chain can be sharpened while in position upon the saw and without taking the saw out of service to provide a properly sharpened smooth running, fast cutting saw chain. While the invention has been particularly described with respect to scratcher chains, it is apparent that it is applicable to any type of chain having cutter links with cutting edges on the outer portions of cutter elements positioned rearwardly of the midpoints of lines joining the center of the pivots of the respective cutter links.

I claim:

1. The method of sharpening a saw chain having cutter elements and depth gauges on cutter links with said cutter elements having cutting edges adjacent their outer portions and positioned rearwardly of the midpoints of lines joining the centers of pivots for the respective cutter links and with said depth gauges having kerf engaging surfaces on their outer portions positioned forwardly of said midpoints and at a greater distance therefrom than said cutting edges while said chain is in operative position on a chain saw, which method comprises, mounting said chain in said operative position on the peripheries of a sprocket and a saw bar of a chain saw having a saw bar with a nose portion of substantially greater radius of curvature than the radius of said sprocket, continuously driving said sprocket to continuously advance said saw chain including each of said cutter links around the peripheries of said sprocket and said nose portion and bringing a metal removing sharpening element shaped to fit the outer portions of said cutter elements into contact with said outer portions of each of said cutter links while the last mentioned cutter links are on said sprocket and during their continuous advance around said periphery of said sprocket to sharpen said cutter elements and remove metal from the tops of said depth gauges so that said kerf engaging surfaces of said depth gauges which have been engaged by the same portions of said sharpening element as surfaces of said cutter elements are radially inwardly of said surfaces of said cutter elements when said cutter links are advanced about the periphery of said nose portion and so that the sharpened cutting edges of said cutter links have relief facilitating boring operations with said chain saw.

2. A sharpening device for a saw chain having cutter elements on cutter links with cutting edges on their outer portions positioned rearwardly of midpoints of lines joining the centers of pivots for the respective cutter links, said device comprising a sharpening element for sharpening said chain while said chain is mounted upon a sprocket and saw bar of a chain saw having a motor housing supporting said sprocket with said saw bar extending from said housing and while said chain is being driven by said sprocket to continuously advance said cutter links about the peripheries of said sprocket and said saw bar, said sharpening element being mounted on said chain saw housing adjacent said sprocket for movement having a component radially of said sprocket toward said periphery of said sprocket, and means for moving said sharpening element to bring it into contact with said outer portions of each of said cutter elements while the last mentioned cutter elements are on said sprocket and during their continuous advance around said periphery of said sprocket to provide sharpened cutting edges on said cutter elements which have relief facilitating boring operations with a chain saw having a saw bar with a nose portion having a greater radius than said sprocket.

3. A sharpening device for a saw chain having cutter elements on cutter links with cutting edges on their outer portions positioned rearwardly of midpoints of lines joining the centers of pivots for the respective cutter links and with depth gauges having top surfaces positioned forwardly of said midpoints and at greater distances from said midpoints than said cutting edges, said device comprising a sharpening element for sharpening said chain while said chain is mounted upon a sprocket and saw bar of a chain saw having a motor housing supporting said sprocket with said saw bar extending from said housing and while being driven by said sprocket to continuously advance said cutter links about the peripheries of said sprocket and saw bar, said sharpening element being mounted on said chain saw housing adjacent said sprocket for movement having a component radially of said sprocket toward said periphery of said sprocket, and means for moving said sharpening element to bring it into contact with said outer portions of said cutter elements and said depth gauges of each of said cutter links while the last mentioned cutter links are on said sprocket and during their continuous advance around said periphery of said sprocket to provide depth gauges and sharpened edges on cutting elements which have relief facilitating boring operations with a chain saw having a saw bar with a nose portion having a greater radious than said sprocket.

4. A sharpening device for a saw chain having cutter elements on cutter links with cutting edges on their outer portions positioned rearwardly of midpoints of lines joining the centers of pivots for the respective cutter links, said device comprising a sharpening element for sharpening said chain while said chain is mounted upon the peripheries of a sprocket and a saw bar of a chain saw and while being driven by said sprocket to continuously advance said cutter links about the periphery of said sprocket, said sharpening element being mounted on said chain saw adjacent said sprocket for movement having a component radially of said sprocket toward said periphery of said sprocket, and means for moving said sharpening element to bring it into contact with said outer portions of each of said cutter elements while the last mentioned cutter elements are on said sprocket and during their continuous advance around said periphery of said sprocket to provide sharpened edges on said cutter elements which have relief facilitating boring operations with a chain saw having a saw bar with a nose portion having a greater radius than said sprocket, said sharpening element being a cylindrical element having circumferentially extending metal cutting teeth thereon, said sharpening element being mounted on said chain saw with its axis extending tangentially to the direction of movement of said cutter elements about said sprocket.

5. A sharpening device for a saw chain having side slitter cutter elements and raker cutter elements on separate cutter links with cutting edges on the outer portions of said cutter elements and positioned rearwardly of midpoints of lines joining the centers of pivots for the respective cutter links, said raker cutter elements being laterally disposed relatively to said side slitter elements toward the center of said chain, said device comprising a sharpening element for sharpening said chain while said chain is mounted upon a sprocket and saw bar of a chain saw and while being driven by said sprocket to advance said cutter links about the periphery of said sprocket, said sharpening element being a cylindrical element having circumferentially extending metal cutting teeth thereon, said sharpening element being mounted on said chain saw adjacent said sprocket with its cylindrical axis extending tangentially to the direction of movement of said cutter elements about said sprocket and also being mounted on said saw for rotation about its cylindrical axis and for movement in the plane of said sprocket and at an angle to said cylindrical axis so as to have a component of said movement toward said periphery of said sprocket, and means for moving said sharpening element to bring it into contact with said outer portions of said cutter elements while said cutter elements are being advanced around said periphery of said sprocket.

6. A sharpening device for a saw chain having cutter elements on cutter links with cutting edges on their outer portions positioned rearwardly of midpoints of lines joining the centers of pivots for the respective cutter links, said device comprising a sharpening element for sharpening said chain while said chain is mounted upon the peripheries of a sprocket and saw bar of a chain saw and while being driven by said sprocket to continuously advance said cutter links about the periphery of said sprocket, said sharpening element being mounted on said chain saw adjacent said sprocket for movement having a component radially of said sprocket toward said periphery of said sprocket, and means for moving said sharpening element to bring it into contact with said outer portions of each of said cutter elements while the last mentioned cutter elements are on the periphery of said sprocket and during their continuous advance around said periphery of said sprocket to provide sharpened edges on said cutter elements which have relief facilitating boring operations with a chain saw having a saw bar with a nose portion having a greater radius than said sprocket, said sharpening element being a grinding wheel journaled for rotation about an axis parallel to the axis of said sprocket.

7. A sharpening device for a saw chain having cutter elements on cutter links with cutting edges on their outer portions and positioned rearwardly of midpoints of lines joining the center of pivots for the ends of the respective cutter links for sharpening said chain while said chain is being driven to continuously advance said cutter elements in an arcuate path on a support member, said device comprising a cylindrical sharpening member mounted adjacent and radially outwardly of said support member for sharpening contact with said cutter elements and having its axis in the central plane of said path and extending parallel to a tangent to said path through the area of contact of said sharpening member with each of said cutter elements, said sharpening member having a metal removing cylindrical surface thereon and being mounted for movement having a component in a direction radially of said path and toward said cutter elements, and means to move said sharpening member into contact with each of said cutter elements while the last mentioned cutter elements are on said support and during their continuous advance in said path to provide sharpened edges on said cutter elements which have relief facilitating boring operations with a chain saw having a saw bar with a nose portion having a greater radius than said support.

8. The method of sharpening a saw chain having cutting elements positioned on cutter links rearwardly of the midpoints of lines joining the centers of pivots for the respective cutter links and having cutting edges on said cutter elements adjacent their outer portions while said saw chain is in operative position on a chain saw, which method comprises, mounting said chain in said operative position on the peripheries of a sprocket and a saw bar of a chain saw having a saw bar with a nose portion of substantially greater radius of curvature than the radius of said sprocket, continuously driving said sprocket to continuously advance said saw chain including each of said cutter elements around the peripheries of said bar and said sprocket, and engaging said outer portions of each of said cutter elements while it is on said sprocket and during its continuous advance around said periphery of said sprocket with a sharpening element to thereby sharpen said cutter elements in a manner facilitating boring operations with said chain saw.

9. The method of sharpening a saw chain having cutter links with side slitter cutter elements and raker cutter elements on separate ones of said cutter links with said raker cutter elements laterally disposed relative to said slitter elements toward the center of said chain and with cutting edges on the outer portions of said cutting elements positioned rearwardly of the midpoints of lines joining the center points of pivots for the respective cutter links while said chain is in operative position on a chain saw, which method comprises mounting said chain in said operative postion on the peripheries of a sprocket and a saw bar of a chain saw having a saw bar with a nose portion of substantially greater radius of curvature than the radius of said sprocket, continuously driving said sprocket to continuously advance said saw chain including each of said cutter elements around the periphery of said saw bar and said sprocket, and engaging said outer portions of each said cutter element while it is on said sprocket and during its continuous advance around said periphery of said sprocket with a sharpening element shaped to produce an arcuate beveled surface on said side slitter cutter elements and an arcuate outer surface on said raker cutter elements to provide sharpened cutting edges at the forward edges of said surfaces having relief facilitating boring operations with said chain saw.

10. The method of sharpening a saw chain having cutting elements positioned on cutter links rearwardly of the midpoints of lines joining the centers of pivots for the respective cutter links and having cutting edges on said cutter elements adjacent their outer portions while said saw chain is in operative position on a chain saw, which method comprises, mounting said saw chain in said operative position on the peripheries of a sprocket and a saw bar of a chain saw having a saw bar with a nose portion of substantially greater radius of curvature than the radius of said sprocket, continuously driving said sprocket to continuously advance said saw chain including each of said cutter elements around the peripheries of said bar and said sprocket, and engaging said outer portions of each of said cutter elements while it is on said sprocket and during its continuous advance around said periphery of said sprocket with a grinding wheel sharpening element driven from said chain saw to thereby sharpen said cutter elements in a manner facilitating boring operations with said chain saw.

11. The method of sharpening a saw chain having cutting elements positioned on cutter links and raker elements positioned on other links rearwardly of the midpoints of lines joining the centers of pivots for the respective cutter links and other links and having cutting edges on said cutter elements and raker elements adjacent their outer portions and depths gauges positioned on said cutter link forwardly of said midpoints a greater distance than said cutter elements are positioned rearwardly of said midpoints while said saw chain is in operative position on a chain saw which method comprises, mounting said saw chain in said operative position on the peripheries of a sprocket and a saw bar of a chain saw having a saw bar with a nose portion of substantially greater radius of curvature than the radius of said sprocket, continuously driving said sprocket to continuously advance said saw chain including each of said cutter elements around the peripheries of said bar and said sprocket, and engaging said outer portions of each of said cutter elements while it is on said sprocket and during its continuous advance around said periphery of said sprocket with a grinding wheel sharpening element driven from said chain saw to thereby sharpen said cutter elements in a manner facilitating boring operations with said chain saw.

12. A sharpening device for a saw chain having cutter elements on cutter links with cutting edges on their outer portions positioned rearwardly of midpoints of lines joining the centers of pivots for the respective cutter links, said device comprising a sharpening element for sharpening said chain while said chain is mounted upon a sprocket and saw bar of a chain saw having a motor housing supporting said sprocket with said saw bar extending from said housing and while said chain is being driven by said sprocket to continuously advance said cutter links about the peripheries of said sprocket and said saw bar, said sharpening element being a grinding wheel mounted on said chain saw housing adjacent said sprocket for rotation and for movement having a component radially of said sprocket toward said periphery of said sprocket, means for rotating said sharpening element, and means for moving said sharpening element to bring it into contact with said outer portions of each of said cutter elements while the last mentioned cutter elements are on said sprocket and during their continued advance around said periphery of said sprocket to provide sharpened cutting edges on said cutter elements which have relief facilitating boring operations with a chain saw having a saw bar with a nose portion having a greater radius than said sprocket.

13. A sharpening device for a saw chain having cutter elements on cutter links and raker elements on other links with cutting edges on their outer portions positioned rearwardly of midpoints of lines joining the centers of pivots for the respective cutter links and other links with depth gauges on said cutter links having top surfaces positioned forwardly of said midpoints and at greater distances from said midpoints than said cutting edges on said cutter elements, said device comprising a sharpening element for sharpening said chain while said chain is mounted upon a sprocket and saw bar of a chain saw having a motor housing supporting said sprocket with said chain bar extending from said housing and while being driven by said sprocket to continuously advance said cutter links about the peripheries of said sprocket and saw bar, said sharpening element being a grinding wheel mounted on said chain saw housing adjacent said sprocket for rotation and for movement having a component radially of said sprocket toward said periphery of said sprocket, means for rotating said sharpening element, and means for moving said sharpening element to bring it into contact with said outer portions of said cutter elements and said depth gauges of each of said cutter links while the last mentioned cutter links are on said sprocket and during their continuous advance around said periphery of said sprocket to provide depth gauges and sharpened edges on cutting elements which have relief facilitating boring operations with a chain saw having a saw bar with a nose portion having a greater radius than said sprocket.

References Cited in the file of this patent

UNITED STATES PATENTS

| | | |
|---|---|---|
| 2,264,278 | Danforth | Dec. 2, 1941 |
| 2,651,336 | Warren | Sept. 8, 1953 |
| 2,805,587 | Goehle | Sept. 10, 1957 |
| 2,821,097 | Carlton | Jan. 28, 1958 |

FOREIGN PATENTS

| | | |
|---|---|---|
| 581,061 | Germany | Dec. 4, 1930 |
| 811,667 | Germany | Aug. 23, 1951 |